United States Patent
Olivier et al.

(10) Patent No.: US 11,006,151 B2
(45) Date of Patent: May 11, 2021

(54) METHOD AND DEVICE FOR ENCODING BOTH A HDR PICTURE AND A SDR PICTURE OBTAINED FROM SAID HDR PICTURE USING COLOR MAPPING FUNCTIONS

(71) Applicant: INTERDIGITAL MADISON PATENT HOLDINGS, SAS, Paris (FR)

(72) Inventors: Yannick Olivier, Thorignè Fouillard (FR); Fabrice Leleannec, Mouazè (GA); Patrick Lopez, Livrè sur Changeon (FR); Philippe Bordes, Laille (FR); Sebastien Lasserre, Thorignè Fouillard (FR); David Touze, Rennes (FR)

(73) Assignee: INTERDIGITAL MADISON PATENT HOLDINGS SAS, Paris (FR)

( * ) Notice: Subject to any disclaimer, the term of this patent is extended or adjusted under 35 U.S.C. 154(b) by 0 days.

(21) Appl. No.: 15/741,257

(22) PCT Filed: Jun. 27, 2016

(86) PCT No.: PCT/EP2016/064837
§ 371 (c)(1),
(2) Date: Dec. 30, 2017

(87) PCT Pub. No.: WO2017/001330
PCT Pub. Date: Jan. 5, 2017

(65) Prior Publication Data
US 2018/0192077 A1 Jul. 5, 2018

(30) Foreign Application Priority Data
Jun. 30, 2015 (EP) .................................... 15306048

(51) Int. Cl.
*H04N 7/12* (2006.01)
*H04N 11/02* (2006.01)
(Continued)

(52) U.S. Cl.
CPC ........... *H04N 19/98* (2014.11); *H04N 19/182* (2014.11); *H04N 19/186* (2014.11); *H04N 19/30* (2014.11); *H04N 19/44* (2014.11); *H04N 19/70* (2014.11)

(58) Field of Classification Search
CPC .... H04N 19/182; H04N 19/186; H04N 19/30; H04N 19/44; H04N 19/70; H04N 19/98
See application file for complete search history.

(56) References Cited

U.S. PATENT DOCUMENTS

| 6,078,357 A | 6/2000 | Yamamoto |
| 7,106,352 B2 | 9/2006 | Deering |
(Continued)

FOREIGN PATENT DOCUMENTS

| CN | 103503429 A | 1/2014 |
| CN | 103843058 A | 6/2014 |
(Continued)

OTHER PUBLICATIONS

Lasserre et al., "Single layer low-bit depth EDR video coding with SDR/HDR backward compatibilities", ISO/IEC JTC1/SC29/WG11), Coding of Moving Pictures and Audio, Document ISO/IEC JTC1/SC29/WG11 MPEG2014/M36083, Geneva, Switzerland, Feb. 2015, pp. 1-5 (Year: 2015).*

(Continued)

*Primary Examiner* — Jessica M Prince
(74) *Attorney, Agent, or Firm* — Invention Mine LLC

(57) ABSTRACT

A method and device of encoding both a HDR picture ($I_{HDR}$) and a first SDR picture ($I_{SDR1}$) obtained from said HDR picture, in at least one bitstream (F1, F2, F3, F4). The
(Continued)

method comprises: —obtaining (210) a second SDR picture ($I_{SDR2}$) by tone-mapping the HDR picture ($I_{HDR}$); —obtaining (230) a color mapping function (CMF) that allows the mapping of the colors of the second SDR picture ($I_{SDR2}$) onto the colors of a third SDR picture ($I_{SDR3}$) obtained (220) from the first SDR picture ($I_{SDR1}$); —encoding (240), in a bitstream, an information (INF) representative of the color mapping function; and —encoding (260), in a bitstream, a fourth SDR picture ($I_{SDR4}$) obtained (250) from the first SDR picture ($I_{SDR1}$). The present disclosure further relates to a method and device of decoding.

20 Claims, 8 Drawing Sheets

(51) Int. Cl.
*H04N 19/98* (2014.01)
*H04N 19/30* (2014.01)
*H04N 19/182* (2014.01)
*H04N 19/186* (2014.01)
*H04N 19/44* (2014.01)
*H04N 19/70* (2014.01)

(56) References Cited

U.S. PATENT DOCUMENTS

| | | | |
|---|---|---|---|
| 7,558,436 | B2 | 7/2009 | Zuro |
| 8,014,445 | B2 | 9/2011 | Segall et al. |
| 8,731,287 | B2 | 5/2014 | Su et al. |
| 9,480,434 | B2 | 11/2016 | De Haan |
| 9,584,811 | B2 | 2/2017 | Su |
| 10,390,027 | B2 | 8/2019 | Lasserre |
| 2002/0171663 | A1 | 11/2002 | Kobayashi |
| 2007/0091213 | A1 | 4/2007 | Jaspers |
| 2008/0175495 | A1 | 7/2008 | Segall |
| 2009/0167955 | A1 | 7/2009 | Pettitt |
| 2010/0066762 | A1 | 3/2010 | Yeh |
| 2010/0103200 | A1 | 4/2010 | Langendijk |
| 2010/0166301 | A1 | 7/2010 | Jeon |
| 2011/0194618 | A1* | 8/2011 | Gish .......... G06T 5/50 375/240.25 |
| 2013/0108183 | A1 | 5/2013 | Bruls |
| 2013/0188696 | A1 | 7/2013 | Liu |
| 2014/0037206 | A1* | 2/2014 | Newton .......... H04N 19/597 382/166 |
| 2014/0086321 | A1 | 3/2014 | Efremov |
| 2014/0210847 | A1 | 7/2014 | Knibbeler |
| 2014/0247870 | A1 | 9/2014 | Mertens |
| 2014/0327822 | A1 | 11/2014 | Gish |
| 2015/0003749 | A1 | 1/2015 | Kim et al. |
| 2015/0016735 | A1 | 1/2015 | Kikuchi |
| 2015/0221280 | A1 | 8/2015 | Van Der Vleuten |
| 2015/0358646 | A1* | 12/2015 | Mertens .......... H04N 1/6058 382/166 |
| 2016/0134872 | A1 | 5/2016 | Su |
| 2016/0253792 | A1* | 9/2016 | Xu .......... H04N 1/6052 345/590 |

FOREIGN PATENT DOCUMENTS

| | | |
|---|---|---|
| CN | 105324997 A | 2/2016 |
| EP | 2890129 | 7/2015 |
| EP | 2958327 | 12/2015 |
| JP | H11313338 A | 11/1999 |
| JP | 2002204373 A | 7/2002 |
| RU | 2504011 C2 | 1/2014 |
| WO | 2010105036 A1 | 9/2010 |
| WO | 2012122426 A1 | 9/2012 |
| WO | 2012142589 A2 | 10/2012 |
| WO | WO2013103522 | 7/2013 |
| WO | 2014009844 A1 | 1/2014 |
| WO | 2014077827 A1 | 5/2014 |
| WO | WO2014128586 | 8/2014 |
| WO | 2014204865 A1 | 12/2014 |
| WO | WO2015097118 | 7/2015 |

OTHER PUBLICATIONS

Lasserre et al., "Single layer low-bit depth EDR video coding with SDR/HDR backward compatibilities", ISO/IEC JTC1/SC29/WG11), Coding of Moving Pictures and Audio, Document ISO/IEC JTC1/SC29/WG11 MPEG2014/M36083, Geneva, Switzerland, Feb. 2015, pp. 1-5.

Boyce et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, Document JCTVC-R1013_v6, Sapporo, Japan, Jun. 30, 2014, pp. 1-541.

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Anonymous, "Conformance specification for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.1, Oct. 2014, pp. 1-42.

Anonymous, "Advanced video coding for generic audiovisual Services", ITU-T H.264, Telecommunication Standardization Sector of ITU, Series H: Audiovisual and Multimedia Systems, Infrastructure of audiovisual services—Coding of moving video, Feb. 2014, pp. 1-790.

Husak et al. "Report of AHG on HDR and WCG", ISO/IEC JTC1/SC29/WG11), Coding of Moving Pictures and Audio, Document ISO/IEC JTC1/SC29/WG11 M34603, Strasbourg, France, Oct. 2014, pp. 1-5.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Lasserre, S., et. al., "Modulation-based HDR video coding with SDR backward compatibility", Joint Collaborative Team on Video Coding (JCT-VC) of ITU-T SG 16 WP 3 and 1S0/IEC JTC 1/SC 29/WG 11, 21st Meeting, Jun. 2015.

International Telecommunication Union, "Parameter Values for Ultra-High Definition Television Systems for Production and International Programme Exchange." BT Series Broadcasting Service, Recommendation ITU-R BT.2020-1, Jun. 2014, 8 pages.

Pascale, Danny, "A Review of RGB Color Spaces, from xyY to R'G'B". Babel Color, Oct. 6, 2003, 35 pages.

International Telecommunication Union, "High Efficiency Video Coding". Series H: Audiovisual and Multimedia Systems; Infrastructure of Audiovisual Services—Coding of Moving Video, Recommendation ITU-TH.265, Telecommunication Standardization Sector of ITU, Apr. 2013, 317 pages.

SMPTE Standard, "High Dynamic Range Electro-Optical Transfer Function of Mastering Reference Displays". The Society of Motion Picture and Television Engineers (SMPTE) Standard, SMPTE Standard 2084:2014, approved Aug. 16, 2014, pp. 1-14.

Kwon, Hyuk-Ju, et. al., "Compensation of De-Saturation Effect in HDR Imaging Using a Real Scene Adaptation Model." Journal of Visual Communication and Image Representation, vol. 24, (2013), pp. 678-685.

Chae, Seok-Min, et. al. "A Tone Compression Model for the Compensation of White Point Shift Generated from HDR Rendering." IEICE Transactions on Fundamentals of Electronics, Communications and Computer Sciences, vol. E95-A, No. 8, Aug. 2012, pp. 1297-1301.

(56) References Cited

OTHER PUBLICATIONS

Wang, Tsun-Hsien, et. al., "Design and Implementation of a Real-Time Global Tone Mapping Processor for High Dynamic Range Video". IEEE International Conference on Image Processing, (2007), pp. VI-209-VI-212.
Lasserre, Sebastien, et. al., "Modulation-Based HDR Video Coding with SDR Backward Compatibility". Joint Collaborative Team on Video Coding (JCT-VC) of ITU-T SG 16 WP 3 and ISO/IEC JTC 1/SC 29/WG 11 21st Meeting, Jun. 19-26, 2015, JCTVC-U0085, pp. 1-15.
Iwahashi, Masahiro, et. al., "Efficient Lossless Bit Depth Scalable Coding for HDR Images". Proceedings of the 2012 Asia Pacific Signal and Information Processing Association Annual Summit and Conference, (2012), pp. 1-4.
Mantiuk, Rafal, et. al., "Backward Compatible High Dynamic Range MPEG Video Compression." ACM Transactions on Graphics, SIGGRAPH Papers, (2006), pp. 713-723.
International Search Report and Written Opinion of the International Searching Authority for PCT/EP2016/051449, dated Apr. 5, 2016.
International Preliminary Report on Patentability for PCT/EP2016/051449 dated Aug. 1, 2017, 12 pages.
International Telecommunication Union, "High Efficiency Video Coding". Series H: Audiovisual and Multimedia Systems; Infrastructure of Audiovisual Services—Coding of Moving Video, Recommendation ITU-TH.265, Telecommunication Standardization Sector of ITU, Oct. 2014, 540 pages.
Le Leannec, Fabrice Le et al., "Usage of Modulation Channel for High Bit-Depth and Floating Point Signal Encoding". Joint Collaborative Team on Video Coding (JCT-VC) of ITU-T SG 16 WP 3 and ISO/IEC JTC 1/SC 29/WG 11 18th Meeting, JCTVC-R0267, Jun. 30-Jul. 9, 2014, pp. 1-12.
Andrivon, P., et. al., "AVC Update with Colour Remapping Information SEI Message". Motion Picture Expert Group (MPEG) Meeting, M35665, Feb. 6-20, 2015.
Le Leannec, Fabrice Le et al., "Usage of Modulation Channel for High Bit-Depth and Floating Point Signal Encoding". Joint Collaborative Team on Video Coding (JCT-VC) of ITU-T SG 16 WP 3 and ISO/IEC JTC 1/SC 29/WG 11 18th Meeting, JCTVD--R0267r1, Jun. 30-Jul. 9, 2014, pp. 1-12.
Tsai, Chi-Yi, "A Fast Dynamic Range Compression with Local Contrast Preservation Algorithm and Its Application to Real-Time Video Enhancement". IEEE Transactions on Multimedia, vol. 14, No. 4, Aug. 2012, pp. 1140-1152.
International Search Report and Written Opinion of the International Searching Authority for PCT/EP2016/064839 dated Dec. 13, 2016, 10 pages.
International Preliminary Report on Patentability for PCT/EP2016/064839 dated Jan. 2, 2018, 7 pages.
Andrivon, Pierre et. al., "SEI message for Colour Mapping Information". Joint Collaborative Team on Video Coding (JCT-VC) of ITU-T SG 16 WP 3 and ISO/IEC JTC 1/SC 29/WG 11 17th Meeting, JCTVC-Q0074-r3, Mar. 27-Apr. 4, 2014, pp. 1-14.
International Telecommunication Union, "Parameter Values for Ultra-High Definition Television Systems for Production and International Programme Exchange". BT Series, Broadcasting Service (Television), Recommendation ITU-R BT.2020-1, Jun. 2014, 8 pages.
SMPTE Standard, "High Dynamic Range Electro-Optical Transfer Function of Mastering Reference Displays". Society for Motion Picture and Television Engineers (SMPTE), Aug. 16, 2014, pp. 1-14.

* cited by examiner

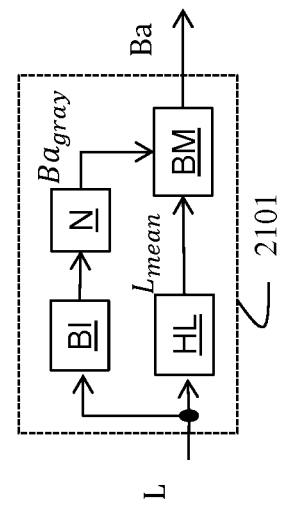
Fig. 9
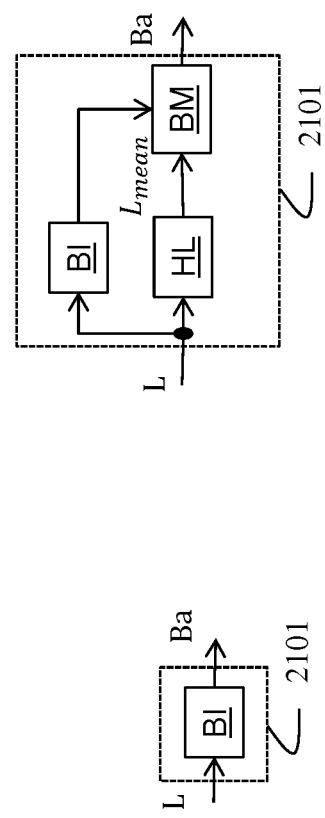
Fig. 8d
Fig. 8c
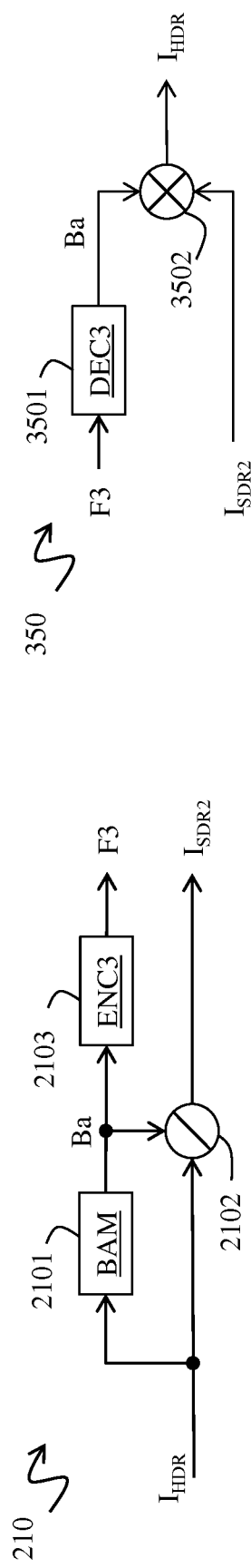
Fig. 8a
Fig. 8b

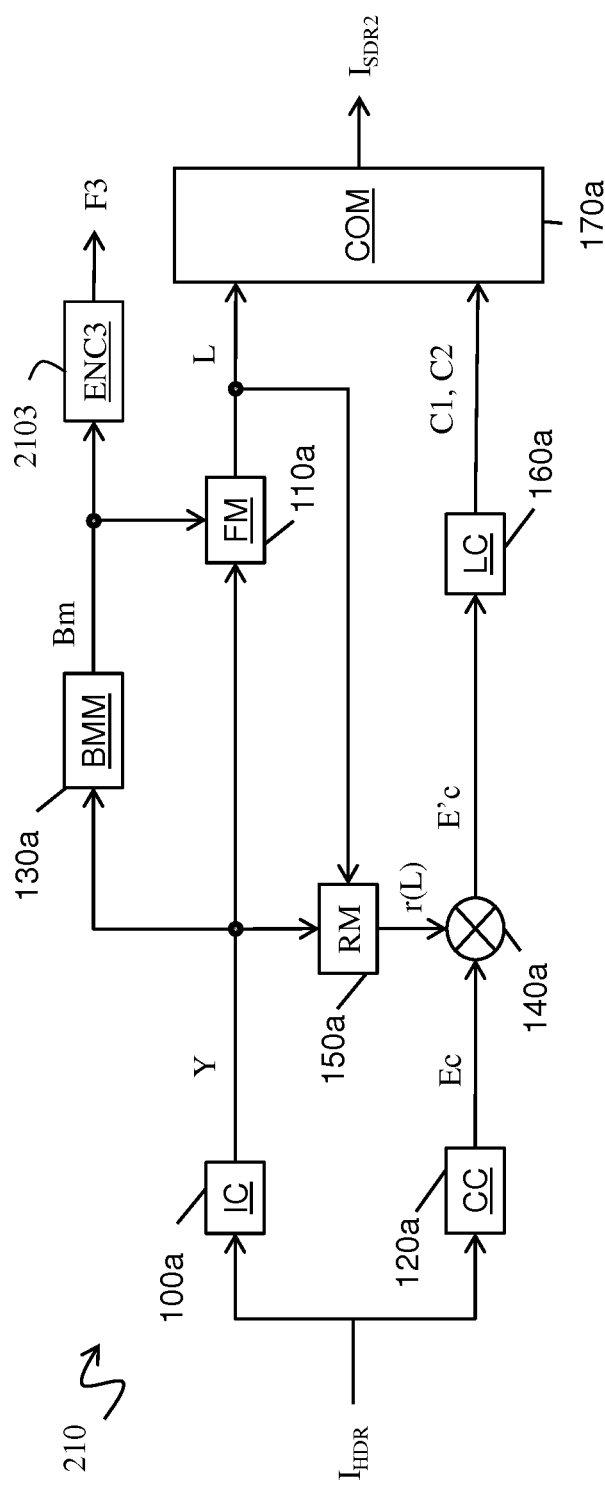
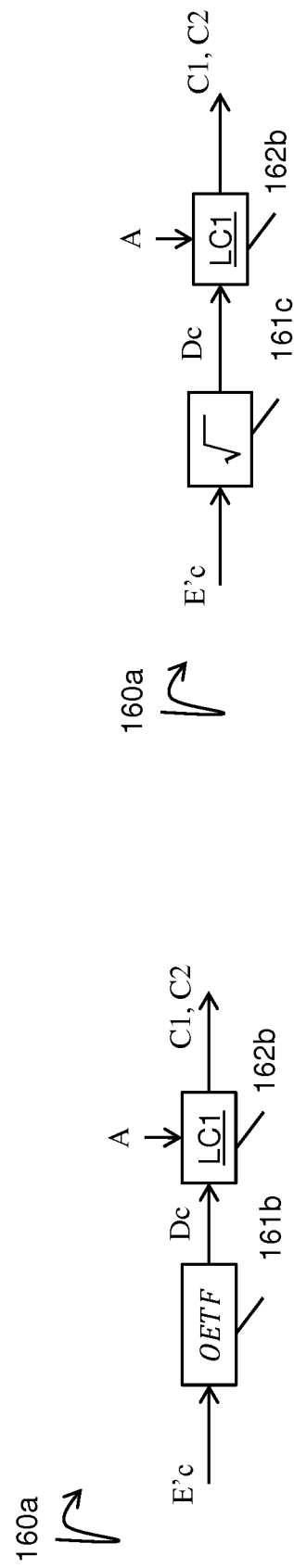
Fig. 10a
Fig. 10b
Fig. 10c

METHOD AND DEVICE FOR ENCODING BOTH A HDR PICTURE AND A SDR PICTURE OBTAINED FROM SAID HDR PICTURE USING COLOR MAPPING FUNCTIONS

This application claims the benefit, under 35 U.S.C. § 365 of International Application PCT/EP2016/064837, filed Jun. 27, 2016, which was published in accordance with PCT Article 21(2) on Jan. 5, 2017, in English, and which claims the benefit of European Patent Application No. 15306048.8, filed on Jun. 30, 2015.

1. FIELD

The present disclosure generally relates to picture/video encoding and decoding.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic range, also called a dynamic in the following, around 10 f-stops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OETF (Optico-Electrical-Transfer-Function) (Rec. ITU-R BT.709-5, April 2002) or ITU-R BT.2020 OETF (Rec. ITU-R BT.2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device.

A color gamut is sometimes defined by RGB primaries provided in the CIE1931 color space chromaticity diagram and a white point as illustrated in FIG. 1.

It is common to define primaries in the so-called CIE1931 color space chromaticity diagram. This is a two dimensional diagram (x,y) defining the colors independently on the luminance component. Any color XYZ is then projected in this diagram using the transform:

$$\begin{cases} x = \dfrac{X}{X+Y+Z} \\ y = \dfrac{Y}{X+Y+Z} \end{cases}$$

The z=1−x−y component is also defined but carry no extra information.

A gamut is defined in this diagram by the triangle whose vertices are the set of (x,y) coordinates of the three primaries RGB. The white point W is another given (x,y) point belonging to the triangle, usually close to the triangle center.

A color volume is defined by a color space and a dynamic range of the values represented in said color space.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

As explained extensively in "*A Review of RGB Color Spaces*" by Danny Pascale, a change of gamut, i.e. a transform that maps the three primaries and the white point from a gamut to another, can be performed by using a 3×3 matrix in the linear RGB color space. Also, a change of space from XYZ to RGB is performed by a 3×3 matrix. As a consequence, regardless of whether RGB or XYZ is the color space, a change of gamut can be performed by a 3×3 matrix. For example, a gamut change from BT.2020 linear RGB to BT.709 XYZ can be performed by a 3×3 matrix.

High Dynamic Range pictures (HDR pictures) are color pictures whose luminance values are represented with a HDR dynamic that is higher than the dynamic of a SDR picture.

The HDR dynamic is not yet defined by a standard but one may expect a dynamic range up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture (of a video) is captured using tri-chromatic cameras into RGB color values composed of 3 components (Red, Green and Blue). The RGB color values depend on the tri-chromatic characteristics (color primaries) of the sensor.

A HDR color-graded version of the captured picture (or video) is then obtained in order to get theatrical renders (using a specific theatrical grade). Typically, the values of the first color-graded version of the captured picture (or video) are represented according to a standardized YUV format such as BT.2020 which defines parameter values for UHDTV.

The YUV format is typically performed by applying a non-linear function, so called Optical Electronic Transfer Function (OETF) on the linear RGB components to obtain non-linear components R'G'B', and then applying a color transform (usually a 3×3 matrix) on the obtained non-linear R'G'B' components to obtain the three components YUV. The first component Y is a luminance component and the two components U,V are chrominance components.

Then, a Colorist, usually in conjunction with a Director of Photography, performs a control on the color values of the first color-graded version of the captured picture (or video) by fine-tuning/tweaking some color values in order to instill an artistic intent.

A SDR color-graded version of the captured picture is also obtained to get home release renders (using specific home, Blu-Ray Disk/DVD grade). Typically, the values of the second color-graded version of the captured picture are represented according to a standardized YUV format such as ITU-R Recommendation BT.601 (Rec. 601) which defines studio encoding parameters of Standard Digital Television for standard 4:3 and wide-screen 16:9 aspect ratios, or ITU-R Recommendation BT.709 which defines parameter values for High Definition Television systems (HDTV).

Obtaining such a SDR color-graded version of the captured picture usually comprises shrinking the color volume of the first color-graded version of the captured picture (for example RGB BT.2020 1000 nits modified by the Colorist) in order that the second color-graded version of the captured picture belong to a second color volume (RGB BT.709 1000 nits for example). This is an automatic step which uses a color mapping function (CMF) (for example for mapping of RGB BT.2020 format to RGB BT.709) usually approximated by a three dimensional look-up-table (also called 3D LUT). Note that all the considered YUV formats are characterized with the Color primaries parameters that allow defining any RGB-to-YUV and YUV-to-RGB color mappings.

Then, a Colorist, usually in conjunction with a Director of Photography, performs a control on the color values of the second color-graded version of the captured picture by fine-tuning/tweaking some color values in order to instill the artistic intent in the home release.

The problem to be solved is the distribution of both the HDR color-graded version and the SDR color-graded version of the captured picture (or video), i.e. the distribution of a compressed HDR picture (or video) representative of a color-graded version of a captured picture (or video) while, at the same time, distributing an associated SDR picture (or video) representative of a color-graded SDR version of said captured picture (or video) for backward compatibility with legacy SDR displays for example. Said associated SDR picture (or video) is sometimes called an imposed SDR picture (video).

A straightforward solution is simulcasting both these HDR and SDR color graded pictures (or videos) on a distribution infrastructure. The drawback of this solution is to virtually double the needed bandwidth compared to a legacy infrastructure adapted to broadcast a SDR picture (or video) such as HEVC main 10 profile ("*High Efficiency Video Coding*", SERIES H: AUDIOVISUAL AND MULTIMEDIA SYSTEMS, Recommendation ITU-T H.265, Telecommunication Standardization Sector of ITU, October 2014).

Using a legacy distribution infrastructure is a requirement to accelerate the emergence of the distribution of HDR pictures (or video). Also, the bitrate shall be minimized while ensuring good quality of both the HDR and SDR pictures (or videos).

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The present principles set out to remedy at least one of the drawbacks of the prior art with a method of encoding both a HDR picture and a first SDR picture obtained from said HDR picture, in at least one bitstream, the method comprising:

obtaining a second HDR picture from the HDR picture by:
        obtaining a luminance component by applying a non-linear function, that depends on a modulation value obtained from the luminance of the color picture, on the luminance of the color picture, in order that the dynamic of said luminance component is reduced compared to the dynamic of the luminance of the color picture;
        obtaining two chrominance components by:
            obtaining at least one intermediate color component by scaling each color component by a factor that depends on the luminance component; and
            obtaining said two chrominance components from said at least one intermediate color components;
    the second HDR picture is obtained by combining together the luminance component and the two chrominance components.
    obtaining a color mapping function that allows the mapping of the colors of the second SDR picture onto the colors of a third SDR picture obtained from the first SDR picture;
    encoding, in a bitstream, an information representative of the color mapping function; and
    encoding, in a bitstream, a fourth SDR picture obtained from the first SDR picture.

In accordance with an example of the principles, the third and fourth SDR pictures are the first SDR picture.

In accordance with an example of the principles, the fourth SDR picture is the first SDR picture and the third SDR picture is a decoded version of the encoded first SDR picture.

In accordance with an example of the principles, the third SDR picture is the first SDR picture and the fourth SDR picture is obtained by applying the color mapping function onto the colors of the second SDR picture.

In accordance with an example of the principles, the third SDR picture is a decoded version of the encoded first SDR picture and the fourth SDR picture is obtained by applying the color mapping function onto the colors of the second SDR picture.

According to another of their aspects, the present principles relate to a method of decoding a HDR picture from at least one bitstream comprising:
- obtaining a decoded first SDR picture from a decoded fourth SDR picture obtained by decoding a bitstream;
- obtaining an information representative of a color mapping function by decoding a bitstream;
- obtaining a decoded second SDR picture by applying the inverse of the color mapping function to the colors of a decoded third SDR picture obtained from the decoded first SDR picture; and
- obtaining a decoded HDR picture from the decoded second SDR picture by:
  - obtaining a first component by applying a non-linear function on a luminance component, obtained from the bitstream, in order that the dynamic of said first component is increased compared to the dynamic of the luminance component;
  - obtaining at least one color component from said first component, two chrominance component obtained from the bitstream and from a factor that depends on the luminance component (L); and
- the decoded picture is obtained by combining together said at least one color component.

According to another of their aspects, the present principles relate to a device of encoding both a HDR picture and a first SDR picture obtained from said HDR picture, in at least one bitstream, characterized in that the device comprises a processor configured to:
- obtain a second HDR picture from the HDR picture by:
  - obtaining a luminance component by applying a non-linear function, that depends on a modulation value obtained from the luminance of the color picture, on the luminance of the color picture, in order that the dynamic of said luminance component is reduced compared to the dynamic of the luminance of the color picture;
  - obtaining two chrominance components by:
    - obtaining at least one intermediate color component by scaling each color component by a factor that depends on the luminance component; and
    - obtaining said two chrominance components from said at least one intermediate color components;
  - the second HDR picture is obtained by combining together the luminance component and the two chrominance components;
- obtain a color mapping function that allows the mapping of the colors of the second SDR picture onto the colors of a third SDR picture obtained from the first SDR picture;
- encode, in a bitstream, an information representative of the color mapping function; and
- encode, in a bitstream, a fourth SDR picture obtained from the first SDR picture.

According to another of their aspects, the present principles relate to a device of decoding a HDR picture from at least one bitstream, characterized in that the device comprises a processor configured to:
- obtain a decoded first SDR picture from a decoded fourth SDR picture obtained by decoding a bitstream;
- obtain an information representative of a color mapping function by decoding a bitstream;
- obtain a decoded second SDR picture by applying the inverse of the color mapping function to the colors of a decoded third SDR picture obtained from the decoded first SDR picture; and
- obtain a decoded HDR picture from the decoded second SDR picture by:
  - obtaining a first component by applying a non-linear function on a luminance component, obtained from the bitstream, in order that the dynamic of said first component is increased compared to the dynamic of the luminance component;
  - obtaining at least one color component from said first component, two chrominance component obtained from the bitstream and from a factor that depends on the luminance component; and
- the decoded picture is obtained by combining together said at least one color component.

According to other of their aspects, the present principles relate to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated. It shows:

FIG. 8a-d show diagrams of the sub-steps of the step 210 in accordance with examples of the present principles;

FIG. 9 shows a diagram of the steps of a method for decoding both a HDR picture and a SDR picture in accordance with an example of the present principles.

Figure 12:
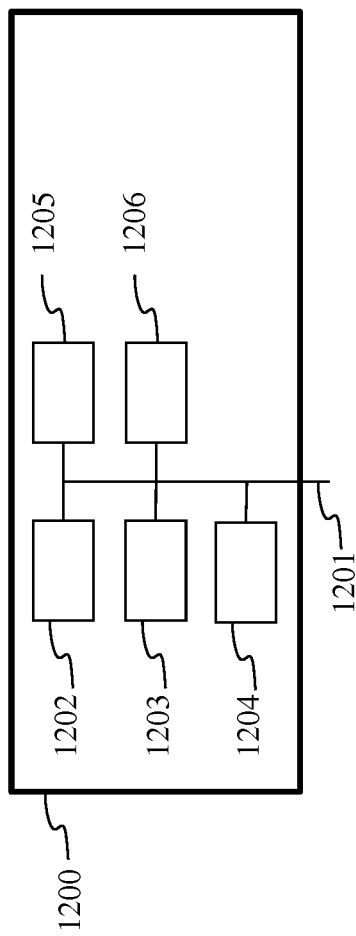
Figure 13:
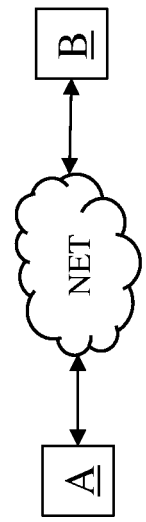

FIG. 10a-c show diagrams of the sub-steps of the step 210 in accordance with examples of the present principles;

FIG. 11a-d show diagrams of the steps of a method of decoding a HDR picture and a SDR picture from at least one bitstream in accordance with an example of the present principles;

FIG. 12 shows an example of an architecture of a device in accordance with an example of present principles; and FIG. 13 shows two remote devices communicating over a communication network in accordance with an example of present principles;

Similar or same elements are referenced with the same reference numbers.

6. DESCRIPTION OF EMBODIMENTS

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "an example", "one embodiment" or "an embodiment" means that a particular feature, structure, or characteristic described in connection with the embodiment or an example can be included in at least one implementation of the disclosure. The appearances of the phrase "in one embodiment", "according to an embodiment" "in one example" or "in accordance with an example" in various places in the specification are not necessarily all referring to the same embodiment or example, nor are separate or alternative embodiments or examples necessarily mutually exclusive of other embodiments or examples.

Reference numerals appearing in the claims are by way of illustration only and shall have no limiting effect on the scope of the claims.

While not explicitly described, the present embodiments and variants may be employed in any combination or sub-combination.

The present principles is described for encoding/decoding a picture but extends to the encoding/decoding of a sequence of pictures (video) because each picture of the sequence is sequentially encoded/decoded as described below.

Figure 1:
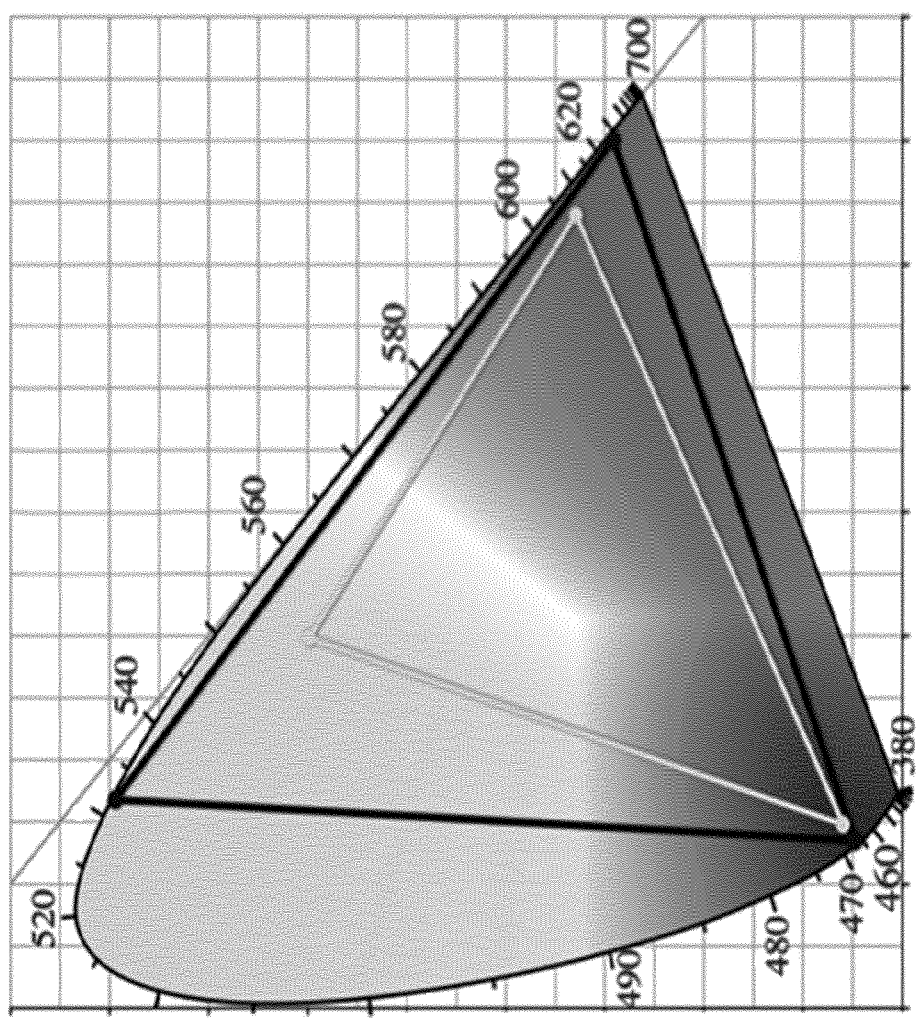
FIG. 1 shows examples of CIE1931 color space chromaticity diagram.
Figure 2:
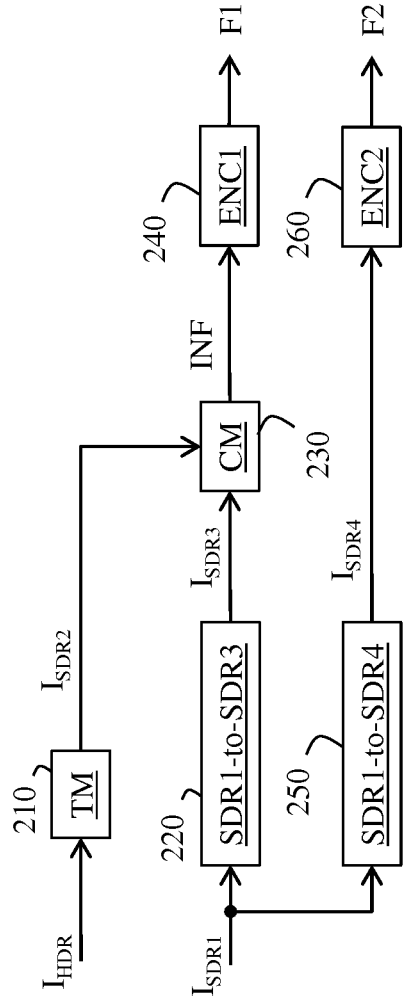
FIG. 2 shows a block diagram of the steps of a method for encoding both a HDR picture and a SDR picture in accordance with the present principles.

FIG. 2 shows a diagram of the steps of a method for encoding both a HDR picture $I_{HDR}$ and a SDR picture $I_{SDR1}$ in accordance with the present principles.

The HDR picture $I_{HDR}$ is a color-graded version of a captured picture (or video) according to a first grade, and the first SDR picture $I_{SDR1}$ is a color-graded version of said captured picture (or video) according to a second grade as explained above. The constraint on this encoding method is that the color-grade of the SDR picture $I_{SDR1}$ shall be rendered at the decoder or at least a SDR picture having a visual content very close to the visual content of SDR picture $I_{SDR1}$ in order to preserve the artist intent.

In step 210, a module TM obtains a second SDR picture $I_{SDR2}$ by tone-mapping the HDR picture $I_{HDR}$.

The term 'tone-mapping' means any approach that reduces the dynamic range of the HDR picture $I_{HDR}$ to a targeted dynamic range. Examples of tone-mapping approaches are given in FIG. 8a-d, 9, 10a-d but the present disclosure is not limited to a specific tone-mapping approach.

In step 220, a module SDR1-to-SDR3 obtains a third SDR picture $I_{SDR3}$ from the first SDR picture $I_{SDR1}$.

In step 230, a module CM obtains a color mapping function CMF that allows the mapping of the colors of the second SDR picture $I_{SDR2}$ onto the colors of the third SDR picture $I_{SDR3}$ in order to minimize the differences between the second SDR picture $I_{SDR2}$ and the third SDR picture $I_{SDR3}$.

For example, the color mapping function is obtained by minimizing a mean square error calculated by subtracting the pixel values of the third SDR picture $I_{SDR3}$ from the pixels of the SDR picture $I_{SDR2}$. An example of color mapping function is given by the standard HEVC with color remapping information SEI message (Annex. D.2.32). The present disclosure is not limited to a specific color mapping function but extend to any kind of mapping function.

In step 240, an encoder ENC1 encodes, in a bitstream F1, an information INF representative of the color mapping function CMF.

According to an embodiment of the method, the information INF is an index allowing to retrieve the color mapping function CMF from a list of color mapping functions.

According to an embodiment of the method, the information INF represent parameters of the color mapping function CMF.

In step 250, a module SDR1-to-SDR4 obtains a fourth SDR picture $I_{SDR4}$ from the first SDR picture $I_{SDR1}$.

In step 260, an encoder ENC2 encodes the fourth SDR picture $I_{SDR4}$ in a bitstream F2.

Figure 3:
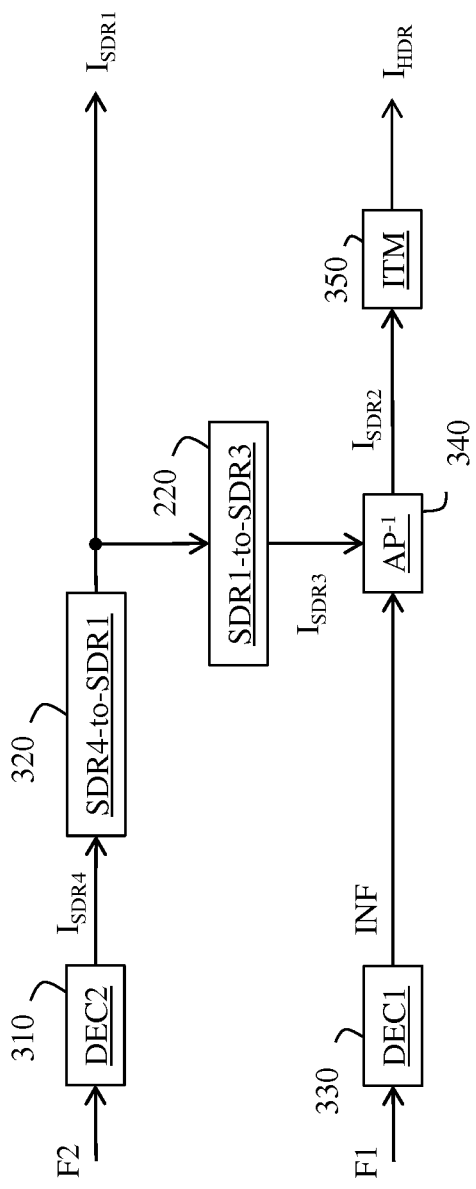
FIG. 3 shows a diagram of the steps of a method for decoding a HDR picture $I_{HDR}$ and a SDR picture $I_{SDR1}$ in accordance with an example of the present principles.

FIG. 3 shows a diagram of the steps of a method for decoding a HDR picture $I_{HDR}$ and a SDR picture $I_{SDR1}$ in accordance with an example of the present principles.

In step 310, a decoder DEC2 obtains a decoded SDR picture, called a decoded fourth SDR picture $I_{SDR4}$, by decoding a bitstream F2.

In step 320, a module SDR4-to-SDR1 obtains a decoded first SDR picture $I_{SDR1}$ from the decoded fourth SDR picture $I_{SDR4}$.

In step 220, the module SDR1-to-SDR3 obtains a decoded third SDR picture $I_{SDR3}$ from the decoded first SDR picture $I_{SDR1}$.

In step 330, a decoder DEC1 obtains an information INF representative of a color mapping function CMF by decoding at least partially a bitstream F1.

According to a variant, the information INF is representative of the inverse of the color mapping function CMF.

In step 340, a module $AP^{-1}$ obtains a decoded second SDR picture $I_{SDR2}$ by applying the inverse $CMF^{-1}$ of the color mapping function CMF to the colors of the decoded third SDR picture $I_{SDR3}$.

In step 350, a module ITM obtains a decoded HDR picture $I_{HDR}$ by applying an inverse-tone-mapping to the decoded second SDR picture $I_{SDR2}$.

The inverse-tone-mapping is the inverse of the tone-mapping used in step 210 in FIG. 2.

Figure 4:
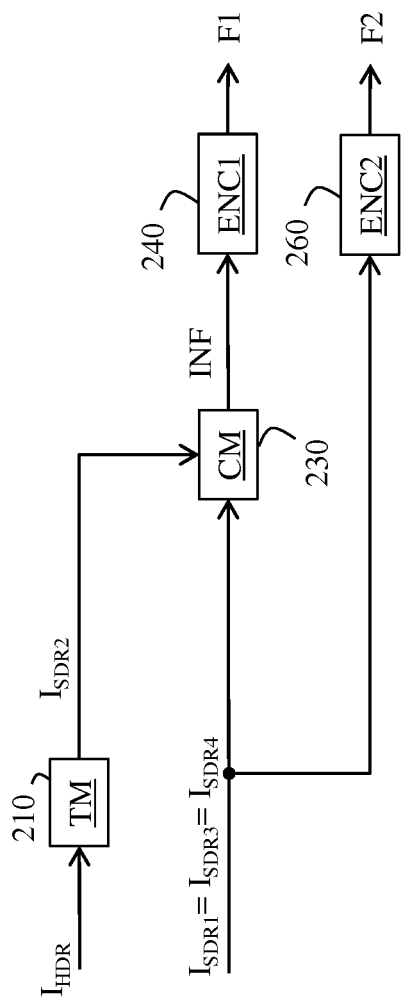
FIG. 4 shows a diagram of the steps of an example of the method for encoding both the HDR picture $I_{HDR}$ and the first SDR picture $I_{SDR1}$ as described in relation with FIG. 2.

FIG. 4 shows a diagram of the steps of an example of the method for encoding both the HDR picture $I_{HDR}$ and the first SDR picture $I_{SDR1}$ as described in relation with FIG. 2.

The modules SDR1-to-SDR3 and SDR1-to-SDR4 are configured in order that the SDR pictures $I_{SDR3}$ and $I_{SDR4}$ equal the SDR picture $I_{SDR1}$.

In other words, those modules do not implement any method.

In step 230, the color mapping function CMF is then obtained to allow the mapping of the colors of the second SDR picture $I_{SDR2}$ onto the colors of the first SDR picture $I_{SDR1}$, and in step 260, the first SDR picture $I_{SDR1}$ is directly encoded by the encoder ENC2.

According to this example of the present principles, the first SDR picture $I_{SDR1}$ as color-graded by the colorist, is thus directly available by decoding the bitstream F2. The artist intent is thus preserved when the decoded first SDR picture $I_{SDR1}$ is displayed.

Figure 5:
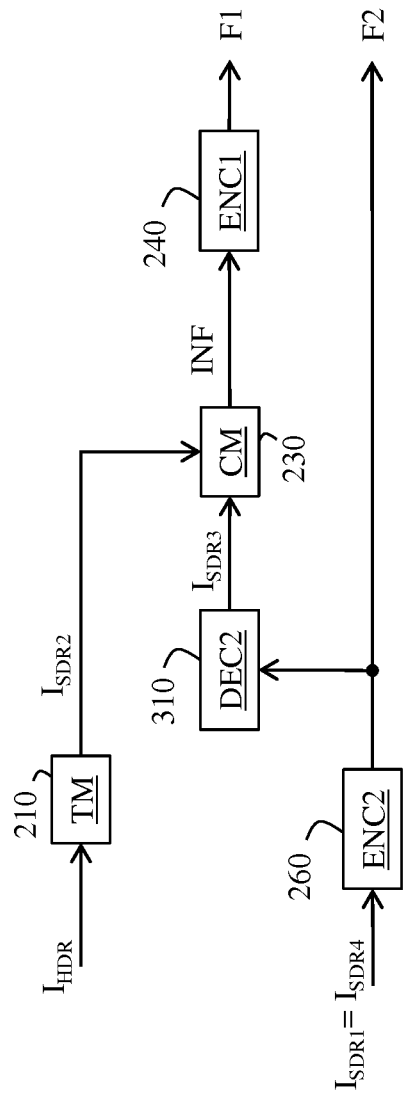
FIG. 5 shows a diagram of the steps of a method for encoding both a HDR picture and a SDR picture in accordance with a variant of FIG. 4.

FIG. 5 shows a diagram of the steps of a method for encoding both a HDR picture $I_{HDR}$ and a SDR picture $I_{SDR1}$ in accordance with a variant of FIG. 4.

The module SDR1-to-SDR4 is configured in order that the fourth SDR picture $I_{SDR4}$ is the first SDR picture $I_{SDR1}$. The first SDR picture $I_{SDR1}$ as color-graded by the colorist, is thus directly available by decoding the bitstream F2. The artist intent is thus preserved when the decoded first picture $I_{SDR1}$ is displayed.

The module SDR1-to-SDR3 is configured to encode the first SDR picture $I_{SDR1}$ by using the encoder ENC2, and to obtain the third SDR picture $I_{SDR3}$ by decoding the encoded first SDR picture $I_{SDR1}$ according to a decoder DEC2 (step 310).

In step 230, the color mapping function CMF is then obtained to allow the mapping of the colors of the SDR picture $I_{SDR2}$ onto the colors of the decoded version of the encoded first SDR picture $I_{SDR1}$.

Determining the color mapping function CMF from the decoded version of the encoded first SDR picture $I_{SDR1}$ rather than from the first SDR picture $I_{SDR1}$, leads to a decoded second SDR picture $I_{SDR2}$ (obtained at the decoding side) whose the content is closer to the content of the second SDR picture $I_{SDR2}$ used at the encoding side. Then, the decoded HDR picture, obtained from the decoded second SDR picture $I_{SDR2}$ and the color mapping function determined from said decoded second SDR picture $I_{SDR2}$, at the encoding side, has a visual content closer to the visual content of the original HDR picture, improving the performance of the HDR encoding/decoding scheme of FIG. 4.

Figure 6:
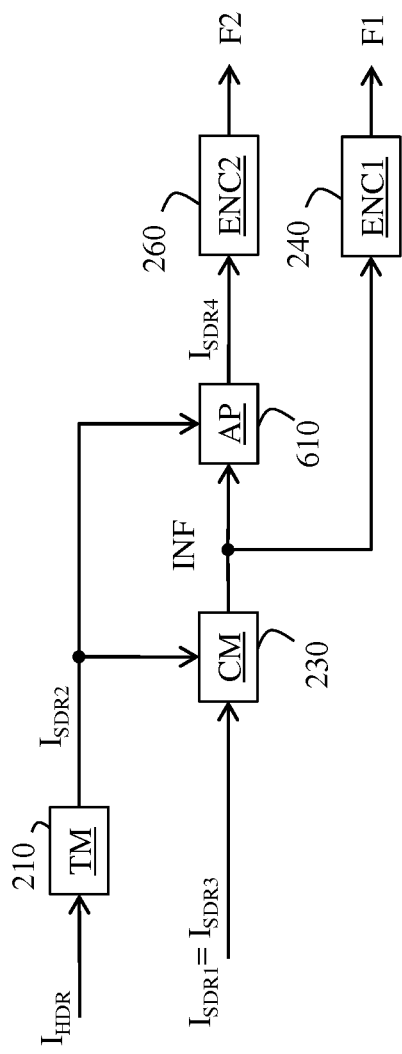
FIG. 6 shows a diagram of the steps of an example of the method for encoding both the HDR picture $I_{HDR}$ and the first SDR picture $I_{SDR1}$ as described in relation with FIG. 2.

FIG. 6 shows a diagram of the steps of an example of the method for encoding both the HDR picture $I_{HDR}$ and the first SDR picture $I_{SDR1}$ as described in relation with FIG. 2;

The module SDR1-to-SDR3 is configured in order that the SDR pictures $I_{SDR3}$ is the SDR picture $I_{SDR1}$.

In step 230, the color mapping function CMF is then obtained to allow the mapping of the colors of the second SDR picture $I_{SDR2}$ onto the colors of a first SDR picture $I_{SDR1}$.

The module SDR1-to-SDR4 comprises a module AP (step 610) to obtain the fourth SDR picture $I_{SDR4}$ by applying the color mapping function CMF (obtained from the SDR picture $I_{SDR1}$) onto the colors of the second SDR picture $I_{SDR2}$.

The content of the fourth SDR picture $I_{SDR4}$ is thus close to the content of the first SDR picture $I_{SDR1}$ because the color mapping function CMF is determined in order to minimize the differences between these two pictures.

Figure 7:
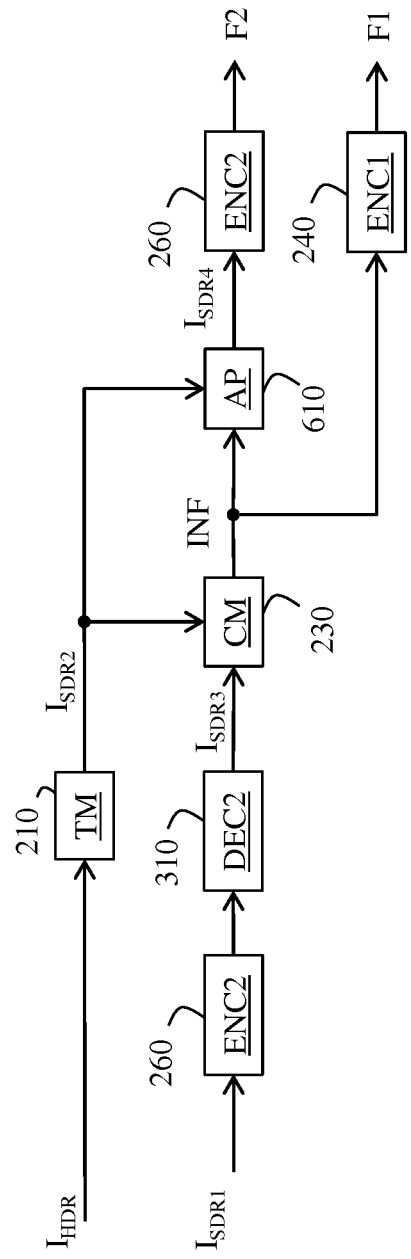
FIG. 7 shows a diagram of the steps of a method for encoding both a HDR picture and a SDR picture in accordance with a variant of FIG. 6.

FIG. 7 shows a diagram of the steps of a method for encoding both a HDR picture $I_{HDR}$ and a SDR picture $I_{SDR1}$ in accordance with a variant of FIG. 6.

The module SDR1-to-SDR3 is configured to encode (step 260) the first SDR picture $I_{SDR1}$ by using the encoder ENC2, and to obtain the third SDR picture $I_{SDR3}$ by decoding the encoded first SDR picture $I_{SDR1}$ according to the decoder DEC2 (step 310).

Determining the color mapping function CMF from the decoded version of the encoded first SDR picture $I_{SDR1}$ rather than from the first SDR picture $I_{SDR1}$, leads to a decoded second SDR picture $I_{SDR2}$ (obtained at the decoding side) whose the content is closer to the content of the second SDR picture $I_{SDR2}$ used at the encoding side. Then, the decoded HDR picture, obtained from the decoded second SDR picture $I_{SDR2}$ and the color mapping function determined from said decoded second SDR picture $I_{SDR2}$, at the encoding side, has a visual content closer to the visual content of the original HDR picture, improving the performance of the HDR encoding/decoding scheme of FIG. 6.

According to an example of the present principles, in step 210, the module TM applies a tone-mapping operator onto the HDR picture $I_{HDR}$ in order to reduce the dynamic range of the luminance of the HDR picture $I_{HDR}$ to a target dynamic range.

The invention is not limited to any specific tone-mapping operator. This single condition is that the tone-mapping operator shall be reversible. For example, the tone-mapping operator defined by Reinhard may be used (Reinhard, E., Stark, M., Shirley, P., and Ferwerda, J., \Photographic tone reproduction for digital images," ACM Transactions on Graphics 21 (July 2002)), or defined by Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), Proc. SPIE 8499, Applications of Digital Image Processing (p. 84990D-84990D-10)).

FIG. 8a-d show diagrams of the sub-steps of the step 210 in accordance with examples of the present principles.

As illustrated in FIG. 8a, the module TM comprises a module BAM configured to obtain a backlight picture Ba from the HDR picture $I_{HDR}$ (step 2101).

According to an embodiment of step 2101, illustrated in FIG. 8b, the module BAM comprises a module BI which obtains the backlight picture Ba from the luminance component L of the HDR picture $I_{HDR}$.

When the HDR picture $I_{HDR}$ belongs to a RGB color space, the luminance component L is obtained, for instance in the 709 color gamut, by a linear combination which is given by:

$$L = 0.2127 \cdot R + 0.7152 \cdot G + 0.0722 \cdot B$$

According to an embodiment, the backlight picture Ba is determined as being a weighted linear combination of shape functions $\psi_i$ given by:

$$Ba = \Sigma_i a_i \psi_i \qquad (1)$$

with $a_i$ being weighting coefficients.

Thus, determining a backlight picture Ba from a luminance component L consists in finding optimal weighting coefficients (and potentially also optimal shape functions if not known beforehand) in order that the backlight picture Ba fits the luminance component L.

There are many well-known methods to find the weighting coefficients $a_i$. For example, one may use a least mean square error method to minimize the mean square error between the backlight picture Ba and the luminance component L.

It may be noted that the shape functions may be the true physical response of a display backlight (made of LED's for instance, each shape function then corresponding to the response of one LED) or may be a pure mathematical construction in order to fit the luminance component at best.

According to a variant of this embodiment, illustrated in FIG. 8c, the module BAM further comprises a module BM which modulate the backlight picture Ba (given by equation (1)) with a mean luminance value $L_{mean}$ of the HDR picture $I_{HDR}$ obtained by the means of a module HL.

According to an example, the module HL is configured to calculate the mean luminance value $L_{mean}$ over the whole luminance component L.

According to an example, the module HL is configured to calculate the mean luminance value $L_{mean}$ by $$L_{mean} = E(L^\beta)^{\frac{1}{\beta}}$$

with $\beta$ being a coefficient less than 1 and $E(X)$ the mathematical expectation value (mean) of the luminance component L.

This last example is advantageous because it avoids that the mean luminance value $L_{mean}$ be influenced by a few pixels with extreme high values which usually leads to very annoying temporal mean brightness instability when the HDR picture $I_{HDR}$ belongs to a sequence of images.

The invention is not limited to a specific embodiment for calculating the mean luminance value $L_{mean}$.

According to a variant, illustrated in FIG. 8d, a module N normalizes the backlight image Ba (given by equation (1)) by its mean value E(Ba) such that one gets a backlight picture $Ba_{gray}$ (having a mid-grey equals to 1) for the HDR picture (or for all HDR pictures if the HDR picture belongs to a sequence or group of pictures):

$$Ba_{gray} = \frac{Ba}{E(Ba)}$$

Then, the module BM is configured to modulate the backlight picture $Ba_{gray}$ with the mean luminance value $L_{mean}$ of the HDR picture $I_{HDR}$, by using the following relation $$Ba_{mod} = cst_{mod} \cdot L_{mean}{}^\alpha \cdot Ba_{gray} \qquad (2)$$

with $cst_{mod}$ being a modulation coefficient and $\alpha$ being another modulation coefficient less than 1, typically ⅓. For example, $cst_{mod} \approx 1.7$ for a backlight picture is obtained by least means squares.

Practically, by linearity, all operations to modulate the backlight picture apply to the backlight coefficients $a_i$ as a correcting factor which transforms the coefficients $a_i$ into new coefficients $\tilde{a}_i$ such that one gets $$Ba_{mod} = \sum_i \tilde{a}_i \psi_i$$

The present disclosure is not limited to any way to obtain a backlight picture Ba from the HDR picture $I_{HDR}$.

In step 2102, in FIG. 8a, the second SDR picture $I_{SDR2}$ is obtained by dividing, pixel by pixel, the HDR picture $I_{HDR}$ by the backlight picture Ba.

In step 2103, an encoder ENC3 encodes the backlight picture Ba in a bitstream F3.

Dividing the HDR picture $I_{HDR}$ by the backlight picture Ba reduces the dynamic range of the HDR picture. A method as described in relation with FIG. 8a-d may thus be considered as being a tone-mapping of the HDR picture $I_{HDR}$.

FIG. 9 shows a diagram of the steps of a method for decoding both a HDR picture and a SDR picture in accordance with an example of the present principles.

This example allows getting both a HDR picture and a SDR picture when those pictures have been previously encoded by a method as described in relation with FIGS. 8a-d.

The module ITM, in step 350, comprises a decoder DEC3 which obtains a decoded backlight picture Ba by decoding a bitstream F3 (step 3501). In step 3502, the decoded HDR picture $I_{HDR}$ is obtained by multiplying the second SDR picture $I_{SDR2}$ by the decoded backlight picture Ba.

Multiplying the second SDR picture $I_{SDR2}$ by the decoded backlight picture Ba increases the dynamic range of the resulting HDR picture compared to the second SDR picture $I_{SDR2}$, i.e such multiplying may be considered as being inverse-tone-mapping.

FIG. 10a-c show diagrams of the sub-steps of the step 210 in accordance with examples of the present principles.

In this example, the HDR picture $I_{HDR}$ is considered as having three color components Ec (c=1, 2 or 3) in which the pixel values of the HDR picture $I_{HDR}$ are represented.

The present disclosure is not limited to any color space in which the three components Ec are represented but extends to any color space such as RGB, CIELUV, XYZ, CIELab, etc.

Basically, a luminance component L and two chrominance components C1 and C2 are determined from the three color components Ec of the HDR picture $I_{HDR}$. The luminance and chrominance components form a SDR color picture whose pixel values are represented in the color space (L, C1, C2). Said SDR color picture is viewable by a legacy SDR display, i.e. has a sufficient visual quality in order to be viewed by a legacy SDR display.

In step 100a, a module IC obtains a component Y that represents the luminance of the HDR picture $I_{HDR}$ by linearly combining together the three components Ec:

$$Y = A_1 \begin{bmatrix} E_1 \\ E_2 \\ E_3 \end{bmatrix}$$

where A1 is the first row of a 3×3 matrix A that defines a color space transforms from the (E1, E2, E3) color space to a color space (Y, C1, C2).

In step 130a, a module BMM obtains a module value Bm from the component Y.

According to an example of the step 130a, the modulation value Bm is an average, median, min or max value of the pixel values of the component Y. These operations may be performed in the linear HDR luminance domain $Y_{lin}$ or in a non-linear domain like ln(Y) or $Y^\gamma$ with γ<1.

In step 110a, a module FM obtains the luminance component L by applying a non-linear function f on the component Y:

$$L = f(Bm, Y) \quad (3)$$

Applying the non-linear function f on the component Y reduces its dynamic range. In other terms, the dynamic of the luminance component L is reduced compared to the dynamic of the component Y.

Basically the dynamic range of the component Y is reduced in order that the luminance values of the component L are represented by using 10 bits.

According to an embodiment, the component Y is divided by the modulation value Bm before applying the non-linear function f:

$$L = f(Y/Bm) \quad (4)$$

According to an embodiment, the non-linear function f is a gamma function:

$$L = B \cdot Y_1^\gamma$$

where $Y_1$ equals either Y or Y/Ba according to the embodiments of eq. (3) or (4), B is a constant value, γ is a parameter (real value strictly below 1).

According to an example, the non-linear function f is a S-Log function:

$$L = a \cdot \ln(Y_1 + b) + c$$

where a, b and c are parameters (real values) of a S Log curve determined such that f(0) and f(1) are invariant, and the derivative of the S Log curve is continuous in 1 when prolonged by a gamma curve below 1. Thus, a, b and c are functions of the parameter γ. Typical values are shown in Table 1.

TABLE 1

| Γ | a | B | c |
|---|---|---|---|
| 1/2.0 | 0.6275 | 0.2550 | 0.8575 |
| 1/2.4 | 0.4742 | 0.1382 | 0.9386 |
| 1/2.8 | 0.3861 | 0.0811 | 0.9699 |

In an advantageous embodiment, a value of γ close to 1/2.5 is efficient in terms of HDR compression performance as well as good viewability of the obtained SDR luma. Thus, the 3 parameters may advantageously take the following values: a=0.44955114, b=0.12123691, c=0.94855684.

According to an example, the non-linear function f is either a gamma correction or a S Log correction according to the pixel values of the component Y.

Applying a gamma correction on the component Y, pulls up the dark regions but does not lower enough high lights to avoid burning of bright pixels.

Then, according to an embodiment, the module FM applies either the gamma correction or the S Log correction according to the pixel values of the component Y. An information data Inf may indicate whether either the gamma correction or Slog correction applies.

For example, when the pixel value of the component Y is below a threshold (equal to 1), then the gamma correction is applied and otherwise the S Log correction is applied.

According to an example, when the method is used to encode several HDR pictures belonging to a sequence of pictures, a modulation value Bm is determined for every HDR picture, a Group of Pictures (GOP) or for a part of a HDR picture such as, but not limited to, a slice or a Transfer Unit as defined in HEVC.

According to an embodiment, the value Bm and/or the parameters of the non-linear function f (such as a, b, c or γ) and/or the information data Inf is (are) stored in a local or remote memory and/or added into a bitstream F3.

In step 120a, at least one color component EC (c=1, 2, 3) is obtained from the HDR picture $I_{HDR}$. A color component Ec may be obtained directly from a local or a remote memory or by applying a color transform on the HDR picture $I_{HDR}$.

In step 140a, an intermediate color component E'c (c=1, 2 or 3) is obtained by scaling each color component Ec by a factor r(L) that depends on the luminance component L:

$$\begin{cases} E'_1(i) = E_1(i) * r(L(i)) \\ E'_2(i) = E_2(i) * r(L(i)) \\ E'_3(i) = E_3(i) * r(L(i)) \end{cases}$$

where r(L(i)) is a factor (real value), determined by the module RM (step 150a), that depends on the value of a pixel i of the component L, E'$_c$(i) is the value of the pixel i of the intermediate color component E'c, and E$_c$(i) is the value of the pixel i of the color component Ec.

Scaling by a factor means multiplying by said factor or dividing by the inverse of said factor.

Scaling each color component Ec by the factor r(L) that depends on the luminance component L preserves the hue of the colors of the HDR picture $I_{HDR}$.

According to an example of the step 150a, the factor r(L) is the ratio of the luminance component L over the component Y:

$$r(L(i)) = \frac{L(i)}{Y(i)}$$

with Y(i) being the value of a pixel i of the component Y. Actually, the value Y(i) of a pixel of the component Y depends non-ambiguously on the value L(i) of a pixel of the luminance component L, such that the ratio can be written as a function of L(i) only.

This example is advantageous because scaling each color component Ec by the factor r(L) that further depends on the component Y preserves the hue of the colors of the HDR picture $I_{HDR}$ and thus improves the visual quality of the decoded color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent said color.

For example, when a CIELUV color space is used, the saturation $s_{uv}$ is defined as the ratio between the chroma Cu over the luminance L*.

$$s_{uv} = \frac{C_{uv}^*}{L^*} = \frac{\sqrt{u^{*2} + v^{*2}}}{L^*}$$

The hue is then given by $$h_{uv} = \arctan \frac{v^*}{u^*}$$

According to another example, when a CIELAB color space is used, the saturation is defined as the ratio of the chroma over the luminance:

$$s_{ab} = \frac{C_{ab}^*}{L^*} = \frac{\sqrt{a^{*2} + b^{*2}}}{L^*}$$

The hue is then given by $$h_{ab} = \arctan \frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/V) fixed does affect the hue and thus the perception of a same color. In step 140a, scaling the color components Ec by a same factor preserves this angle, thus the hue.

Now let us consider that the HDR picture $I_{HDR}$ is represented in the CIELUV color space and a second SDR picture $I_{SDR2}$ that is formed by combining together the luminance component L, whose dynamic range is reduced compared to the dynamic range of the luminance of the HDR picture $I_{HDR}$ (step 110a), and two chrominance components U (=C1) and V (=C2) of the CIELUV color space. The colors of the second SDR picture $I_{SDR2}$ are thus differently perceived by a human being because the saturation and the hue of the colors changed. The method described in relation with FIG. 10a determines the chrominance components C1 and C2 of the second SDR picture $I_{SDR2}$ in order that the hue of the colors of the second SDR picture $I_{SDR2}$ best match the hue of the colors of the HDR picture $I_{HDR}$.

According to an example of the step 150a, the factor r(L) is given by:

$$r(L(i)) = \frac{\max\{5, L(i)\}}{2048\max\{0.01, Y(i)\}}$$

This last embodiment is advantageous because it prevents the factor from going to zero for very dark pixels, i.e. allows the ratio to be invertible regardless of the pixel value.

In step 160a, the two chrominance components C1, C2 are obtained from said at least one intermediate color components E'c.

According to an embodiment of the step 160a, illustrated in FIG. 10b, at least one intermediate component Dc (c=1, 2 or 3) is obtained by applying (step 161b) an OETF on every intermediate color component (E'c):

$$\begin{cases} D_1 = OETF(E_1') \\ D_2 = OETF(E_2') \\ D_3 = OETF(E_3') \end{cases}$$

For example, the OETF is defined by the ITU-R recommendation BT.709 or BT.2020 and stated as follows $$D_c = OETF(E_c') = \begin{cases} 4.5 E_c' & E_c' < 0.018 \\ 1.099 E_c'^{0.45} - 0.099 & E_c' \geq 0.018 \end{cases}.$$

This embodiment allows a reduction of the dynamic range according to a specific OETF but leads to a complex decoding process as detailed later.

According to a variant of this example, illustrated in FIG. 10c, the OETF is approximated by a square root, i.e. at least one intermediate component Dc (c=1, 2 or 3) is obtained by taking the square-root (step 161c) of every intermediate color component (E'c):

$$\begin{cases} D_1 = \sqrt{E_1'} \\ D_2 = \sqrt{E_2'} \\ D_3 = \sqrt{E_3'} \end{cases}$$

This variant is advantageous because it provides a good approximation of the OETF defined by the ITU-R recommendation BT.709 or BT.2020 and leads to a low complexity decoder.

According to another variant, the OETF is approximated by a cubic-root, i.e. at least one intermediate component Dc (c=1, 2 or 3) is obtained by taking the cubic-root of every intermediate color component (E'c):

$$\begin{cases} D_1 = \sqrt[3]{E'_1} \\ D_2 = \sqrt[3]{E'_2} \\ D_3 = \sqrt[3]{E'_3} \end{cases},$$

This variant is advantageous because it provides a good approximation of the OETF defined by the ITU-R recommendation BT.709 or BT.2020 but it leads to a somewhat more complex decoder than the decoder obtains when the OETF is approximated by a square-root.

In step 162b, a module LC1 obtains the two chrominance components C1 and C2 by linearly combining the three intermediate components Dc:

$$\begin{bmatrix} C_1 \\ C_2 \end{bmatrix} = \begin{bmatrix} A_2 \\ A_3 \end{bmatrix} \begin{bmatrix} D_1 \\ D_2 \\ D_3 \end{bmatrix}$$

where A2 and A3 are the second and third rows of the 3×3 matrix A.

In step 170a, as illustrated in FIG. 10a, a module COM obtains the second SDR picture ISDR2 by combining together the luminance component L and the chrominance components C1 and C2.

FIG. 11a-d show diagrams of the steps of a method of decoding a HDR picture and a SDR picture from at least one bitstream in accordance with an example of the present principles.

In step 111a, a module DECOMB obtains a luminance component L and two chrominance components C1, C2 from the second SDR picture $I_{SDR2}$.

In step 113a, a module IFM obtains a first component Y by applying a non-linear function $f^{-1}$ on the luminance component L in order that the dynamic of the first component Y is increased compared to the dynamic of the luminance component L:

$$Y = f^{-1}(Ba, L) \qquad (5)$$

The non-linear function $f^{-1}$ is the inverse of the non-linear function f (step 110a).

Thus, the examples of the function $f^{-1}$ are defined according to the examples of the function f.

Figure 11B:
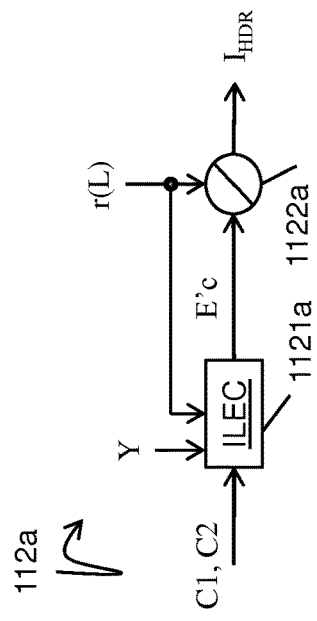
Figure 11A:
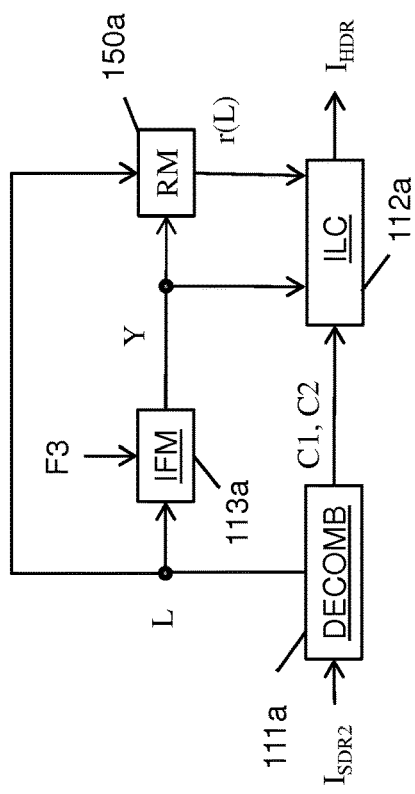

According to an example, the value Bm and/or the parameters of the non-linear function $f^{-1}$ (such as a, b, c or γ) and/or the information data Inf is (are) obtained from a local or remote memory (for example a Look-Up-Table) and/or from a bitstream F3 as illustrated in FIG. 11a.

According to an embodiment, the luminance component L is multiplied by the modulation value Bm after having applied the non-linear function $f^{-1}$:

$$Y = Bm * f^{-1}(L) \qquad (6)$$

According to an example, the non-linear function $f^{-1}$ is the inverse of a gamma function.

The component Y is then given by:

$$Y_1 = \frac{L^{1/\gamma}}{B}$$

where $Y_1$ equals Y or Y/Bm according to the embodiments of eq. (5) or (6), B is a constant value, γ is a parameter (real value strictly below 1).

According to an embodiment, the non-linear function $f^{-1}$ is the inverse of a S-Log function. The component $Y_1$ is then given by:

$$Y_1 = \exp^{(\frac{L-c}{a})} - b$$

According to an embodiment, the non-linear function f is the inverse of either a gamma correction or a S Log correction according to the pixel values of the component Y. This is indicated by the information data Inf.

In step 112a, a module ILC obtains at least one color component Ec from the first component Y, the two chrominance component C1, C2, and from a factor r(L) that depends on the luminance component L. The decoded HDR picture $I_{HDR}$ is then obtained by combining together said at least one color component Ec.

The factor r(L) may be obtained either from a local or remote memory (such a Look-Up-Table) or from a bitstream.

When a general OETF is applied on every intermediate color component E'c (step 161b in FIG. 10b), the intermediate components Dc are related to the component Y, the two chrominance components C1, C2 and the factor r(L):

$$Y = A_1 \begin{bmatrix} E_1 \\ E_2 \\ E_3 \end{bmatrix} = A_1 \begin{bmatrix} E'_1 \\ E'_2 \\ E'_3 \end{bmatrix} / r(L) = A_1 \begin{bmatrix} EOTF(D_1) \\ EOTF(D_2) \\ EOTF(D_3) \end{bmatrix} / r(L) \qquad (7a)$$

and $$\begin{bmatrix} C_1 \\ C_2 \end{bmatrix} = \begin{bmatrix} A_2 \\ A_3 \end{bmatrix} \begin{bmatrix} D_1 \\ D_2 \\ D_3 \end{bmatrix} \qquad (7b)$$

where EOTF (Electro-Optical Trans Function) is the inverse of OETF applied in step 161b.

Equation (7b) provides $$\begin{cases} D_2 = \partial_2 D_1 + L_2(C_1, C_2) \\ D_3 = \partial_3 D_1 + L_3(C_1, C_2) \end{cases} \qquad (8)$$

where OETF($E_c$)=$D_c$, $\partial_i$ are constants depending on the matrix A and $L_i$ are linear functions also depending on the matrix A. Then, equation (7a) becomes:

$$r(L)*Y = A_{11}EOTF(D_1) + A_{12}EOTF(D_2) + A_{13}EOTF(D_3) \qquad (9)$$

and then $$r(L)*Y = A_{11}EOTF(D_1) + A_{12}EOTF(\partial_2 D_1 + L_2(C_1, C_2)) + A_{13}EOTF(\partial_3 D_1 + L_3(C_1, C_2)) \qquad (10)$$

Equation (10) is an implicit equation on $D_1$ only. Depending on the expression of the EOTF, equation (10) can be more or less solved simply. Once solved, $D_1$ is obtained, $D_2$, $D_3$ are deduced from $D_1$ by equation (8). Then the intermediate color component E'c are obtained by applying the EOTF on the three obtained intermediate components Dc, i.e. E'c=EOTF(Dc).

In this general case, i.e. when a general OETF (does not have any specific property) is applied on each intermediate color component E'c, there exist no analytic solution to equation (10). For instance when the OETF is the ITU-R BT.709/2020 OETF, the equation (10) may be solved numerically by using the so-called Newton's method or any other numerical method to find the root of a regular function. However, this leads to highly complex decoders.

In this general case, according to a first example of the step 112a, illustrated in FIG. 11b, in step 1121a, a module ILEC obtains three intermediate color component E'c from the first component Y, the two chrominance component C1, C2 and the factor r(L) as above explained. In step 1122a, the three color components Ec are obtained by scaling each intermediate color component E'c by the factor r(L):

$$Ec(i) = E'c(i)/r(L(i))$$

where r(L(i)) is the factor given by step 150a that depends on the value of a pixel i of the component L (output of step 111a), $E'_c(i)$ is the value of the pixel i of an intermediate color component E'c, and $E_c(i)$ is the value of the pixel i of the color component Ec.

Actually this order step 1121a before step 1122a is the inverse of the order step 161b followed by step 162b of the encoding method (FIG. 10b).

According to a variant of this first example, the OEFT is a square root function and the EOTF is then a square function.

According to another variant of this first example, the OEFT is a cubic root function and the EOTF is then a cubic function.

When the OETF used in step 161b, fulfills the commutation condition, namely $$OETF(x*y) = OETF(x)*OETF(y),$$

the component Y and the color components Ec are related by:

$$Y = A_1 \begin{bmatrix} E_1 \\ E_2 \\ E_3 \end{bmatrix} = A_1 \begin{bmatrix} EOTF(F_1) \\ EOTF(F_2) \\ EOTF(F_3) \end{bmatrix} \quad (11)$$

where Fc are components equal to OETF(Ec) and $$\begin{bmatrix} C'_1 \\ C'_2 \end{bmatrix} = \begin{bmatrix} C_1 \\ C_2 \end{bmatrix} \Big/ OETF(r(L)) = \begin{bmatrix} A_2 \\ A_3 \end{bmatrix} \begin{bmatrix} D_1 \\ D_2 \\ D_3 \end{bmatrix} \Big/$$

$$OETF(r(L)) = \begin{bmatrix} A_2 \\ A_3 \end{bmatrix} \begin{bmatrix} OETF(E'_1) \\ OETF(E'_2) \\ OETF(E'_3) \end{bmatrix} \Big/ OETF(r(L)),$$

such that the commutation condition provides $$\begin{bmatrix} C'_1 \\ C'_2 \end{bmatrix} = \begin{bmatrix} A_2 \\ A_3 \end{bmatrix} \begin{bmatrix} OETF(E'_1/r(L)) \\ OETF(E'_2/r(L)) \\ OETF(E'_3/r(L)) \end{bmatrix} = \begin{bmatrix} A_2 \\ A_3 \end{bmatrix} \begin{bmatrix} OETF(E_1) \\ OETF(E_2) \\ OETF(E_3) \end{bmatrix} = \begin{bmatrix} A_2 \\ A_3 \end{bmatrix} \begin{bmatrix} F_1 \\ F_2 \\ F_3 \end{bmatrix} \quad (12)$$

Equation (11) provides $$\begin{cases} F_2 = \partial_2 F_1 + L_2(C'_1, C'_2) \\ F_3 = \partial_3 F_1 + L_3(C'_1, C'_2) \end{cases}$$

where $\partial_i$ are constants depending on the matrix A and $L_i$ are linear functions also depending on the matrix A.

Then, equation (11) becomes:

$$Y = A_{11} EOTF(F_1) + A_{12} EOTF(F_2) + A_{13} EOTF(F_3) \quad (13)$$

and then $$Y = A_{11} EOTF(F_1) + A_{12} EOTF(\partial_2 F_1 + L_2(C'_1, C'_2)) + A_{13} EOTF(\partial_3 F_1 + L_3(C'_1, C'_2)) \quad (14)$$

Figure 11D:
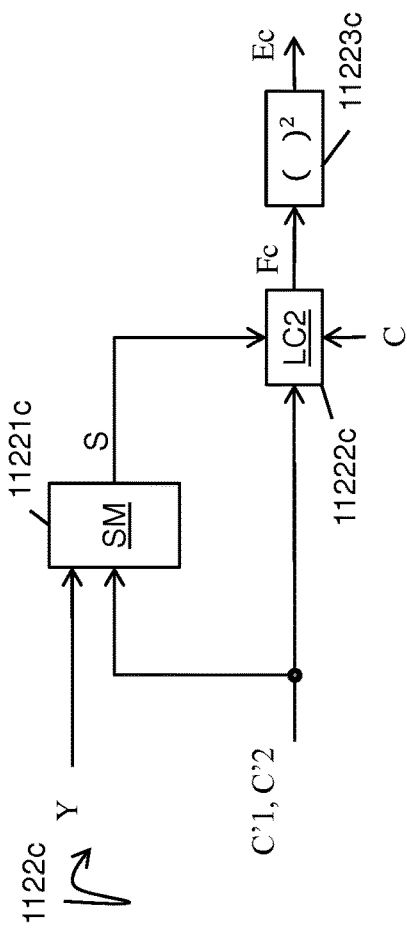
Figure 11C:
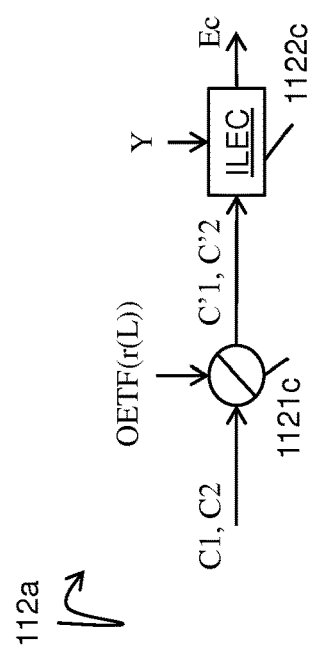

When the OETF fulfills the commutation conditions, according to a second example of the step 112a, illustrated in FIG. 11c, in step 1121c, two intermediate components C'1 and C'2 are obtained by scaling the two chrominance components C1 and C2 by the factor OEFT(r(L(i))) where OETF is the function used in step 161b in FIG. 10b:

$$C'1(i) = \frac{C1(i)}{OETF(r(L(i)))}$$

$$C'2(i) = \frac{C2(i)}{OETF(r(L(i)))}$$

where r(L(i)) is the factor given by step 150a that depends on the value of a pixel i of the component L (output of step 111a), $C'_1(i)$, $C'_2(i)$ is respectively the value of the pixel i of the component C'1 and C'2, $C_1(i)$, $C_2(i)$ is respectively the value of the pixel i of the component C1 and C2.

In step 1122c, a module ILEC obtains the three color components Ec from the first component Y and the two intermediate chrominance components C'1, C'2 as above explained.

According to a variant of this second example, the OEFT is a square root function and the EOTF is then a square function. Then, in step 1122c, the two intermediate components C'1 and C'2 are obtained by scaling the two chrominance components C1 and C2 by the factor $\sqrt{r(L(i))}$ $$C'1(i) = \frac{C1(i)}{OETF(r(L(i)))} = \frac{C1(i)}{\sqrt{r(L(i))}}$$

$$C'2(i) = \frac{C2(i)}{OETF(r(L(i)))} = \frac{C2(i)}{\sqrt{r(L(i))}}$$

Equation(11) becomes:

$$Y = A_1 \begin{bmatrix} E_1 \\ E_2 \\ E_3 \end{bmatrix} = A_1 \begin{bmatrix} F_1^2 \\ F_2^2 \\ F_3^2 \end{bmatrix} \quad (14)$$

-continued and $$\begin{bmatrix} C'_1 \\ C'_2 \end{bmatrix} = \begin{bmatrix} C_1 \\ C_2 \end{bmatrix} \Big/$$

$$\sqrt{r(L)} = \begin{bmatrix} A_2 \\ A_3 \end{bmatrix} \begin{bmatrix} D_1 \\ D_2 \\ D_3 \end{bmatrix} \Big/ \sqrt{r(L)} = \begin{bmatrix} A_2 \\ A_3 \end{bmatrix} \begin{bmatrix} \sqrt{E'_1} \\ \sqrt{E'_2} \\ \sqrt{E'_3} \end{bmatrix} \Big/ \sqrt{r(L)}$$

such that the commutation provides $$\begin{bmatrix} C'_1 \\ C'_2 \end{bmatrix} = \begin{bmatrix} A_2 \\ A_3 \end{bmatrix} \begin{bmatrix} \sqrt{E'_1/r(L)} \\ \sqrt{E'_2/r(L)} \\ \sqrt{E'_2/r(L)} \end{bmatrix} = \begin{bmatrix} A_2 \\ A_3 \end{bmatrix} \begin{bmatrix} \sqrt{E_1} \\ \sqrt{E_2} \\ \sqrt{E_3} \end{bmatrix} = \begin{bmatrix} A_2 \\ A_3 \end{bmatrix} \begin{bmatrix} F_1 \\ F_2 \\ F_3 \end{bmatrix} \quad (15)$$

Equation (14) becomes:

$$Y = A_{11}F_1^2 + A_{12}F_2^2 + A_{13}F_3^2 \quad (16)$$

and $$Y = A_{11}F_1^2 + A_{12}(\partial_2 F_1 + L_2(C'_1,C'_2))^2 + A_{13}(\partial_3 F_1 + L_3(C'_1,C'_2))^2 \quad (17)$$

Equation (17) is a second order equation that may be solved analytically. This analytic solution leads to a specific embodiment of the step 1122c as illustrated in FIG. 11d. This embodiment is advantageous because it allows an analytic expression of the EOTF (inverse of the OETF), and thus of the decoded components of the HDR picture. Moreover, the EOTF is then the square function that is a low complexity process at the decoding side.

In step 11221c, a module SM obtains a second component S by combining together the two intermediate chrominance components C'1, C'2 and the first component Y:

$$S = \sqrt{Y + k_0 C'^2_1 + k_1 C'^2_2 + k_2 C'_1 C'_2}$$

where $k_0$, $k_1$ and $k_2$ parameters values and $C'^2_c$ means the square of a component $C'_c$ (c=1 or 2).

In step 11222c, a module LC2 obtains the three solver components Fc by linearly combining together the intermediate chrominance component C'1, C'2 and a second component S:

$$\begin{bmatrix} F_1 \\ F_2 \\ F_3 \end{bmatrix} = C \begin{bmatrix} S \\ C'_1 \\ C'_2 \end{bmatrix}$$

where C is a 3×3 matrix defined as the inverse of the matrix A.

In step 11223c, the three color components Ec are obtained by taking the square of each intermediate color components (Dc):

$$\begin{bmatrix} E_1 \\ E_2 \\ E_3 \end{bmatrix} = \begin{bmatrix} EOTF(F_1) \\ EOTF(F_2) \\ EOTF(F_3) \end{bmatrix} = \begin{bmatrix} (F_1)^2 \\ (F_2)^2 \\ (F_3)^2 \end{bmatrix}$$

The matrix A determines the transform of the HDR picture $I_{HDR}$ to be encoded from the color space (E1, E2, E3), in which the pixel values of the HDR picture to be encoded are represented, to the color space (Y, C1, C2).

Such a matrix depends on the gamut of the HDR picture $I_{HDR}$ to be encoded.

For example, when the HDR picture to be encoded is represented in the BT709 gamut as defined by ITU-R Rec. 709, the matrix A is given by:

$$A = \begin{bmatrix} 0.2126 & 0.7152 & 0.0722 \\ -0.1146 & -0.3854 & 0.5 \\ 0.5 & -0.4541 & 0.0459 \end{bmatrix}$$

and the matrix C is given by:

$$C = \begin{bmatrix} 1 & 0 & 1.5748 \\ 1 & -0.1874 & -0.4681 \\ 1 & 1.8556 & 0 \end{bmatrix}$$

According to a variant of this second embodiment, the OETF is a cubic root function and the EOTF is then a cubic function. Then, in step 1121c in FIG. 11c, the two intermediate components C'1 and C'2 may then be obtained by scaling the two chrominance components C1 and C2 by the factor $3\sqrt{r(L(i))}$:

$$C'1(i) = \frac{C1(i)}{\sqrt[3]{r(L(i))}}$$

$$C'2(i) = \frac{C2(i)}{\sqrt[3]{r(L(i))}}:$$

The EOTF is then a cubic function thus leading to an equation (17) on $F_1$ being a more complex third order equation which can be solved analytically by the so-called Cardano's method.

Very complex analytic solutions also exist for the fourth order equation (Ferrari's method), but not anymore for any order higher or equal to five as stated by the AbelRuffini theorem.

The decoder DEC1 (respectively DEC2, DEC3) is configured to decode data which have been encoded by the encoder ENC1 (respectively ENC2, ENC3). The encoder ENC1 and/or ENC2 and/or ENC3 (and decoder DEC1 and/or DEC2 and/or DEC3) may be block-based processing.

The encoders ENC1 and/or ENC2 and/or ENC3 (and decoder DEC1 and/or DEC2 and/or DEC3) is not limited to a specific encoder (decoder).

According to an embodiment, the encoder ENC1 is configured to encode the information INF in a SEI message such as the color remapping information SEI message as defined in the HEVC standard (Annex D.2.32).

According to an embodiment, the encoder ENC3 is configured to encode the backlight picture Ba as an auxiliary picture or by using frame packing (Annex D.2.16) as described in the HEVC standard, or to encode the weighting coefficients and possibly the shape functions in a SEI message (HEVC standard, Annex D1).

According to an embodiment, the decoder DEC3 is configured to . . . the decoded backlight picture Ba obtained from an auxiliary picture or a packed frame encoded in the bitstream F1 as described in the HEVC standard, or is obtained from weighting coefficients and possibly shape functions obtained from a SEI message in the bitstream F1.

The encoder ENC1 and/or ENC2 (and decoder DEC1 and/or DEC2) is not limited to a specific encoder which may be, for example, an image/video coder with loss like JPEG, JPEG2000, MPEG2, HEVC recommendation or H264/AVC recommendation ("*Advanced video coding for generic audiovisual Services*", SERIES H: AUDIOVISUAL AND MULTIMEDIA SYSTEMS, Recommendation ITU-T H.264, Telecommunication Standardization Sector of ITU, February 2014)).

The bitstreams F1, F2, F3 may be multiplexed together to form a single bitstream.

On FIG. 1-11*d*, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 12 represents an exemplary architecture of a device 1200 which may be configured to implement a method described in relation with FIG. 1-11*d*.

Device 1200 comprises following elements that are linked together by a data and address bus 1201:
  a microprocessor 1202 (or CPU), which is, for example, a DSP (or Digital Signal Processor);
  a ROM (or Read Only Memory) 1203;
  a RAM (or Random Access Memory) 1204;
  an I/O interface 1205 for reception of data to transmit, from an application; and
  a battery 1206.

In accordance with an example, the battery 1206 is external to the device. In each of mentioned memory, the word «register» used in the specification can correspond to area of small capacity (some bits) or to very large area (e.g. a whole program or large amount of received or decoded data). The ROM 1203 comprises at least a program and parameters. The ROM 1203 may store algorithms and instructions to perform techniques in accordance with present principles. When switched on, the CPU 1202 uploads the program in the RAM and executes the corresponding instructions.

RAM 1204 comprises, in a register, the program executed by the CPU 1202 and uploaded after switch on of the device 1200, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR or SDR picture is obtained from a source. For example, the source belongs to a set comprising:
  a local memory (1203 or 1204), e.g. a video memory or a RAM (or Random Access Memory), a flash memory, a ROM (or Read Only Memory), a hard disk;
  a storage interface (1205), e.g. an interface with a mass storage, a RAM, a flash memory, a ROM, an optical disc or a magnetic support;
  a communication interface (1205), e.g. a wireline interface (for example a bus interface, a wide area network interface, a local area network interface) or a wireless interface (such as a IEEE 802.11 interface or a Bluetooth® interface); and
  an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SDR or HDR picture is sent to a destination; specifically, the destination belongs to a set comprising:
  a local memory (1203 or 1204), e.g. a video memory or a RAM, a flash memory, a hard disk;
  a storage interface (1205), e.g. an interface with a mass storage, a RAM, a flash memory, a ROM, an optical disc or a magnetic support;
  a communication interface (1205), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
  a display.

In accordance with examples of encoding or encoder, the bitstream F1, F2 and/or F3 are sent to a destination. As an example, one of bitstreams F1, F2 and F3 or both bitstreams are stored in a local or remote memory, e.g. a video memory (1204) or a RAM (1204), a hard disk (1203). In a variant, one or both bitstreams are sent to a storage interface (1205), e.g. an interface with a mass storage, a flash memory, ROM, an optical disc or a magnetic support and/or transmitted over a communication interface (1205), e.g. an interface to a point to point link, a communication bus, a point to multipoint link or a broadcast network.

In accordance with examples of decoding or decoder, the bitstream F1, F2 and/or F3 is obtained from a source. Exemplarily, the bitstream is read from a local memory, e.g. a video memory (1204), a RAM (1204), a ROM (1203), a flash memory (1203) or a hard disk (1203). In a variant, the bitstream is received from a storage interface (1205), e.g. an interface with a mass storage, a RAM, a ROM, a flash memory, an optical disc or a magnetic support and/or received from a communication interface (1205), e.g. an interface to a point to point link, a bus, a point to multipoint link or a broadcast network.

In accordance with examples, device 1200 being configured to implement an encoding method described in relation with one of the FIGS. 2, 4-8*d*, 10*a-c*, belongs to a set comprising:
  a mobile device;

a communication device;
a game device;
a tablet (or tablet computer);
a laptop;
a still picture camera;
a video camera;
an encoding chip;
a still picture server; and
a video server (e.g. a broadcast server, a video-on-demand server or a web server).

In accordance with examples, device 1200 being configured to implement a decoding method described in relation with one of the FIGS. 3, 9 11*a-d*, belongs to a set comprising:
a mobile device;
a communication device;
a game device;
a set top box;
a TV set;
a tablet (or tablet computer);
a laptop;
a display and
a decoding chip.

According to an embodiment illustrated in FIG. 13, in a transmission context between two remote devices A and B over a communication network NET, the device A comprises a processor in relation with memory RAM and ROM which are configured to implement a method for encoding a picture as described in relation with one of the FIGS. 2, 4-8*d*, 10*a-c*, and the device B comprises a processor in relation with memory RAM and ROM which are configured to implement which are configured to implement a method for decoding as described in relation with one of the FIGS. 3, 9 11*a-d*.

In accordance with an example, the network is a broadcast network, adapted to broadcast still pictures or video pictures from device A to decoding devices including the device B.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding both a high dynamic range (HDR) picture and a first standard dynamic range (SDR) picture obtained from said HDR picture, in at least one bitstream, the method comprising:
obtaining a second SDR picture by tone mapping the HDR picture;
obtaining a color mapping function that allows a mapping of the colors of the second SDR picture onto colors of a third SDR picture obtained from the first SDR picture;
obtaining a fourth SDR picture by applying said color mapping function onto the colors of the second SDR picture;
encoding, in a bitstream, an information representative of the color mapping function; and
encoding, in a bitstream, said fourth SDR picture.

2. The method of claim 1, wherein the third picture is the first SDR picture.

3. The method of claim 1, wherein the third SDR picture is a decoded version of the encoded first SDR picture.

4. The method according to claim 1, wherein the obtaining of a second SDR picture by tone mapping the HDR picture comprises obtaining inverse tone mapping information from the HDR picture, applying this inverse tone mapping information to the HDR picture and encoding this information in a bitstream.

5. The method according to claim 4, wherein the inverse tone mapping information is a backlight picture that is applied to the HDR picture by dividing, pixel by pixel, the HDR picture by the backlight picture to obtain a second SDR picture.

6. A method of decoding a high dynamic range (HDR) picture from at least one bitstream comprising:
    obtaining a decoded first standard dynamic range (SDR) picture by decoding a bitstream;
    obtaining an information representative of a color mapping function by decoding a bitstream;
    obtaining a decoded second SDR picture by applying a function based on the information representative of the color mapping function to the colors of the decoded first SDR picture; and
    obtaining a decoded HDR picture by applying an inverse-tone-mapping to the decoded second SDR picture wherein the obtaining of a decoded HDR picture by applying an inverse-tone-mapping to the decoded second SDR picture comprises:
    decoding inverse tone mapping information;
    obtaining the decoded HDR picture by applying the inverse tone mapping information the second SDR picture.

7. The method of claim 6, wherein the obtaining of a decoded HDR picture by applying an inverse-tone-mapping to the decoded second SDR picture comprises:
    obtaining a first component by applying a non-linear function on a luminance component, obtained from the bitstream, in order that a dynamic of said first component is increased compared to the dynamic of the luminance component;
    obtaining at least one color component from said first component, two chrominance components obtained from the bitstream and from a factor that depends on the luminance component; and
the decoded picture is obtained by combining together said at least one color component.

8. The method of claim 6, wherein the inverse tone mapping information is a backlight picture and applying the inverse tone mapping information to the SDR comprises multiplying the second SDR picture by the backlight picture.

9. A device for encoding both a high dynamic range (HDR) picture and a first standard dynamic range (SDR) picture obtained from said HDR picture, in at least one bitstream, wherein the device comprises a processor configured to:
    obtain a second SDR picture by tone-mapping the HDR picture;
    obtain a color mapping function that allows a mapping of the colors of a second SDR picture onto the colors of a third SDR picture obtained from the first SDR picture;
    obtain a fourth SDR picture by applying said color mapping function onto the colors of the second SDR picture;
    encode, in a bitstream, an information representative of the color mapping function; and
    encode, in a bitstream, said fourth SDR picture.

10. The device of claim 9, wherein the third picture is the first SDR picture.

11. The device according to claim 9, wherein, to obtain the second SDR picture by tone mapping the HDR picture, the processor is configured to obtain inverse tone mapping information from the HDR picture; apply the inverse tone mapping information to the HDR picture; and encode the inverse tone mapping information in a bitstream.

12. The device of claim 11, wherein the inverse tone mapping information is a backlight picture that is applied to the HDR picture by dividing, pixel by pixel, the HDR picture by the backlight picture to obtain a second SDR picture.

13. A device for decoding a high dynamic range (HDR) picture from at least one bitstream, wherein the device comprises a processor configured to:
    obtain a decoded first standard dynamic range (SDR) picture by decoding a bitstream;
    obtain an information representative of a color mapping function by decoding a bitstream;
    obtain a decoded second SDR picture by applying a function based on the information representative of the color mapping function to the colors of the decoded first SDR picture; and
    obtain a decoded HDR picture by applying an inverse-tone-mapping to the decoded second SDR picture wherein the obtaining of a decoded HDR picture by applying an inverse-tone-mapping to the decoded second SDR picture comprises:
    decode inverse tone mapping information;
    obtain the decoded HDR picture by applying the inverse tone mapping information to the second SDR picture.

14. The device of claim 9, wherein the third SDR picture is a decoded version of the encoded first SDR picture.

15. The device of claim 13, wherein the obtaining of a decoded HDR picture by applying an inverse-tone-mapping to the decoded second SDR picture comprises:
    obtaining a first component by applying a non-linear function on a luminance component, obtained from the bitstream, in order that a dynamic of said first component is increased compared to the dynamic of the luminance component;
    obtaining at least one color component from said first component, two chrominance components obtained from the bitstream and from a factor that depends on the luminance component; and
the decoded picture is obtained by combining together said at least one color component.

16. The device of claim 8, wherein the inverse tone mapping information is a backlight picture and applying the inverse tone mapping information to the second SDR picture comprises multiplying the second SDR picture by the backlight picture.

17. A non-transitory processor readable medium having stored therein instructions for causing a processor to perform a method of encoding both a high dynamic range (HDR) picture and a first standard dynamic range (SDR) picture obtained from said HDR picture, in at least one bitstream, the method comprising:
    obtaining a second SDR picture by tone mapping the HDR picture;

obtaining a color mapping function that allows a mapping of the colors of the second SDR picture onto colors of a third SDR picture obtained from the first SDR picture;

obtaining a fourth SDR picture by applying said color mapping function onto the colors of the second SDR picture;

encoding, in a bitstream, an information representative of the color mapping function; and encoding, in a bitstream, said fourth SDR picture.

18. The non-transitory processor readable medium of claim 11 wherein the obtaining of a second SDR picture by tone mapping the HDR picture comprises obtaining inverse tone mapping information from the HDR picture, applying this inverse tone mapping information to the HDR picture and encoding this information in a bitstream.

19. A non-transitory processor readable medium having stored therein instructions for causing a processor to perform a method of decoding a high dynamic range (HDR) picture, comprising:

obtaining a decoded first standard dynamic range (SDR) picture by decoding a bitstream;

obtaining an information representative of a color mapping function by decoding a bitstream;

obtaining a decoded second SDR picture by applying a function based on the information representative of the color mapping function to the colors of the decoded first SDR picture; and obtaining a decoded HDR picture by applying an inverse-tone-mapping to the decoded second SDR picture wherein the obtaining of a decoded HDR picture by applying an inverse-tone-mapping to the decoded second SDR picture comprises:

decoding inverse tone mapping information;

obtaining the decoded HDR picture by applying the inverse tone mapping information to the second SDR picture.

20. The non-transitory processor readable medium of claim 19, wherein the inverse tone mapping information is a backlight picture and applying the inverse tone mapping information to the second SDR picture comprises multiplying the second SDR picture by the backlight picture.

\* \* \* \* \*

UNITED STATES PATENT AND TRADEMARK OFFICE
CERTIFICATE OF CORRECTION

PATENT NO. : 11,006,151 B2
APPLICATION NO. : 15/741257
DATED : May 11, 2021
INVENTOR(S) : Yannick Olivier et al.

It is certified that error appears in the above-identified patent and that said Letters Patent is hereby corrected as shown below:

In the Claims

At Column 27, Line 34, in Claim 6, delete "information" and insert --information to--

At Column 27, Line 52, in Claim 8, delete "SDR" and insert --second SDR picture--

At Column 28, Line 55, in Claim 16, delete "8" and insert --13--

Signed and Sealed this
Twenty-sixth Day of December, 2023

Katherine Kelly Vidal
*Director of the United States Patent and Trademark Office*